July 14, 1970  D. A. NEWMAN  3,520,766
INK AND DYE RECEPTIVE FABRIC AND PROCESS FOR MAKING THE SAME
Filed Feb. 14, 1967

INVENTOR.
Douglas A. Newman
BY
Johnson and Kline
ATTORNEYS

United States Patent Office 3,520,766
Patented July 14, 1970

3,520,766
INK AND DYE RECEPTIVE FABRIC AND PROCESS FOR MAKING THE SAME
Douglas A. Newman, Glen Cove, N.Y., assignor to Columbia Ribbon and Carbon Manufacturing Co., Inc., Glen Cove, N.Y., a corporation of New York
Filed Feb. 14, 1967, Ser. No. 615,938
Int. Cl. D04h *3/12;* D03d *25/00;* D02j *3/00*
U.S. Cl. 161—87                                7 Claims

ABSTRACT OF THE DISCLOSURE

Process for producing novel thermoplastic filaments and fabrics, such as typewriter ribbons, which are receptive to and retentive of liquids such as dyes and inks which comprises extruding a conventional thermoplastic composition to form a thin body such as a filament or a film and contacting the body, while still tacky, with a powdered solid which adheres to the surface of the filament or film and bonds thereto when the body is cooled. The powdered solid may be an absorptive material such as clay which is retained on the surface, or a soluble material such as common salt which is dissolved from the surface to leave receptive, retentive surface indentations on the surface of the filament or the film.

---

Fiber fabrics are those which are woven, matted or otherwise formed from filaments or multi-filament threads of natural or synthetic fiber-forming materials. Synthetic filaments are formed by conventional extrusion methods using conventional extrusion devices, such as by melting and compounding a synthetic thermoplastic fiber-forming composition and extruding it through a die orifice in the form of continuous filaments which are then cooled in a liquid bath and thereafter heated and stretched to form final filaments of the desired denier and diameter.

The filaments are generally spun into threads and the threads most commonly woven into fabrics. However, such filaments are also commonly matted into fabrics in which the filaments are bonded together by heat fusion of either the filaments or of resinous particles added to the filaments. The present invention is most concerned with fabrics woven from multi-filament threads and fabrics matted from mono-filaments or fibers but is also applicable to any fabric or film based upon synthetic thermoplastic material.

Many of the problems encountered with the use of synthetic thermopalstic films and fabrics stem from the same property thereof, namely the smooth shiny surface which such fibers and films possess to varying degrees. This uniform surface is caused by the extrusion of the filament through the die and the nature of the synthetic resin. The die usually has a smooth orifice and thus the filaments and films are generally formed with a smooth surface. Some thermoplastic filaments may take on a rather irregular cross-section but nevertheless have a smooth shiny surface. Even when the die orifice is altered to give it an irregular or rough circumference, the extruded filaments will have a longitudinally smooth shiny surface even though they have an irregular cross-section since the entire length of the filament is extruded from the same die orifice.

While this smooth shiny surface is advantageous for some applications, it is objectionable for many other applications with which the present invention is concerned. For instance such filaments and films are not very receptive to dye or to ink layers or retentive thereof. Also fabrics formed from such filaments and used as typewriter ribbons have a limited ink capacity and contain the major amount of their ink in the interstices between the filaments and threads and not by trapping through absorption. The ribbons therefore have a very limited ink carrying capacity compared to natural fabrics. On repeated use the ribbons soon produce much lighter images as the ink pockets are emptied. This uneven imaging strength is due to the lack of ink retention by the filaments themselves.

The sheen of fibrous fabrics is also objectionable for some uses such as in the manufacture of men's suits, ladies' hose and other items of apparel.

A related embodiment of the present invention is concerned with the problem of forming stable uniform matted fabrics from mono-filaments or fibers of thermoplastic material. Such fabrics are conventionally formed by matting the fibers and applying heat to soften the fibers and cause them to bond to one another or by adding resin particles to the matted fibers and applying heat to soften the particles and cause them to bond contacting fibers together. The first procedure is unsatisfactory since the melting of the fibers weakens them and thereby weakens the fabric. The second procedure is more common but is difficult to control since it is impossible to locate resin particles between all contacting fibers and thus the bonding of the fibers in the fabric is spotty and uneven.

It is the principal object of this invention to produce synthetic thermoplastic filaments, films and fabrics which have an increased receptivity and retentivity for dyes, liquid inks and solid coatings and which have a dull, non-shiny appearance.

It is a related object of this invention to increase the surface area of synthetic thermoplastic filaments without increasing their diameter or reducing their strength.

It is still another object of this invention to provide filaments or fibers which can be evenly and uniformly bonded to each other in a matted fabric without weakening the filaments or fibers.

These and other objects and advantages of this invention will be clear to those skilled in the art in the light of the following disclosure including the drawings in which.

Figure 1:
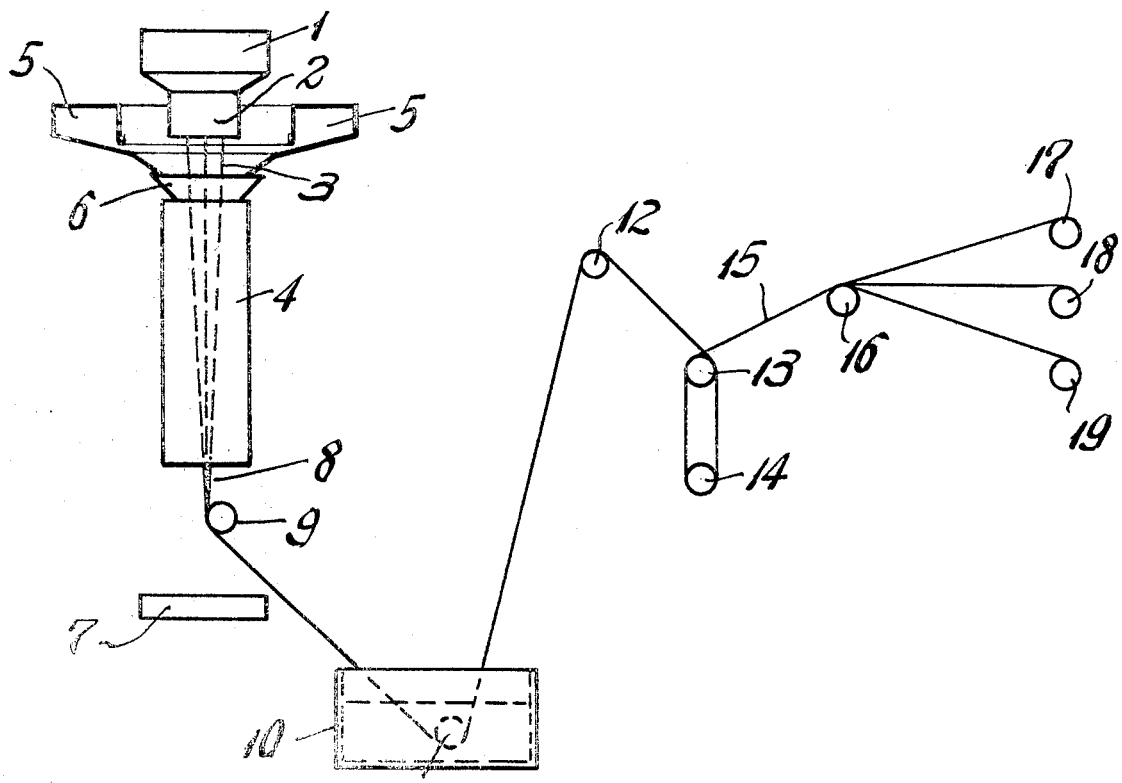
FIG. 1 is a plan view illustrating one type of apparatus useful for carrying out the present filament-making process.

The objects and advantages of the present invention are accomplished by uniformly treating the heat-tackified surface of a synthetic thermoplastic filament or film with a finely-divided solid material which is caused to adhere to substantially the total surface of the filament or to one or both surfaces of the film and which has an average particle size which is smaller than the diameter of the filament or the thickness of the film, and thereafter removing the particles to leave surface depressions on the filament or film or retaining the particles thereon to form a surface layer having properties not possessed by the filament or film itself. The present filaments may be used per se or may be transformed into fabrics having new and unexpected advantages over fabrics formed from conventional filaments.

According to the preferred embodiment in connection with the manufacture of transfer sheets and typewriter ribbons, the finely-divided solid is a material which is soluble in a solvent which does not dissolve the film or filament and is dissolved therefrom to leave small surface pores or depressions over the entire surface. The preferred materials according to this embodiment are nylon filaments, powdered sodium chloride solid and water solvent.

It is also possible to leave the powdered solid adhered to the film or filament in the final fabric. Materails such as powdered carbon black give a dull black color and an increased absorbency while materials such as powdered clay or attapulgite render the films and filaments light in color and exceptionally absorbent of ink, dye and other liquids. The use of other powdered solids to produce the desired functional or aesthetic results will be clear to those skilled in the art in the light of the present disclosure, the only requirement being that the solid material is capable of being reduced to finely-divided or powder condition so that it can adhere to the thin films and filaments and form a uniform outer coating over the surface and substantially completely mask the surface.

It is also possible to use finely-divided solid resins as the powdered solid according to either of the above embodiments. If the powdered resin is to be removed, it is only necessary that the resin is soluble in a solvent which does not dissolve the film or filaments themselves. If the powdered resin is to be left adhered, such as for purposes of bonding filaments together in a matted fabric, it is only necessary that the powdered resin have a lower softening point than the filaments.

The step of adhering the powder particles to the film or filaments may be accomplished in several ways, the essential requirements being that the film or filaments are contacted with the powder particles while the film or filaments are in the soft, tacky condition and prior to the final stretching step. Preferably contact is brought about immediately after the film or filaments are extruded from the die orifice and prior to initial cooling. If done at a later time, the film or filaments must first be heated to the softening temperature of the thermoplastic material to render the surface tacky and adhesive to the powder particles, and the film or filaments must then be stretched to restore their strength. If the powder particles are to be removed from the surface, this is preferably accomplished by using a suitable solvent in the coolant bath prior to stretching. The stretching operation increases the dimensions of the surface imperfections or pores. However, the powder particles may remain on the surface during stretching as the stretching operation appears to cause them to become further embedded in the surface and to form larger surface pores. Thereafter they are either removed or left in place depending upon the nature of the powder and the results desired.

The preferred method of adhering the powder particles to filaments is to extrude the filaments into an atmosphere of the powder particles dispersed in air. The simplest method for accomplishing this result is to pass the extruded filaments downwardly through a chamber into which is also continuously introduced a fine metered dosage of the powder particles, in an apparatus such as shown by FIG. 1 of the drawing. The lightness of the powder particles causes the atmosphere in the chamber to become concentrated with dispersed particles which are able to contact and adhere to the full surface of the filaments. The suspension of the powder particles in air may be improved by blowing a gentle current of warm or hot air up the cylinder against the falling powder. The temperature of the blown air is preferably above the softening temperature of the filaments so as to keep them tacky and adhesive towards the powder particles. The dispersion of the powder particles may also be improved by giving the particles a charge, either positive or negative, so that the particles repel each other and remain dispersed in air for a greater period of time. Likewise the filaments may be given an opposite charge so that the particles are attracted thereto.

It is also possible to apply the powder particles by other means. For instance, the particles may be present as a flotation layer on a liquid bath through which the filaments are drawn. The temperature of the bath is preferably high in order to retain the tacky condition of the filaments and permit the particles to form an adequate bond therewith. Or, if desired, the filaments may be transported over a series of rollers, the surfaces of which carry a continuous supply of the powder which adheres to the filaments and prevents the filaments from adhering to the rollers. The surface speed of the rollers is the same as the speed of the filaments and the filaments are twisted to permit complete coverage with the powder.

Referring to the drawing, the present invention may be carried out using the system illustrated by FIG. 1. The fiber-forming extrusion composition is compounded and heated in conventional manner in extrusion hopper 1 and is introduced into the extrusion die 2 which is provided with orifices of the desired diameter. The composition is forced through the die and exits the orifices in the form of soft, tacky filaments 3. The filaments are passed down through an open-ended cylinder 4 where they are contacted, while still in the soft, tacky state with an atmosphere of powder particles of the desired solid material. The powder particles are introduced continuously from hoppers 5 into funnel 6, those hoppers preferably having screen openings and being gently vibrated to release a uniformly metered amount of material into the funnel. Sufficient powder is introduced to insure complete coverage of the filaments and the excess powder is collected in pan 7 for recycling.

The particle coated filaments 8 are passed over roll 9 and into coolant tank 10 and under roll 11. The liquid in the tank 10 may be water or any other suitable coolant. In cases where the powder particles are to be dissolved from the filament 8, the coolant liquid is one which is a solvent for the powder particles. In all cases, the coolant liquid is a non-solvent for the filaments themselves.

Cooling causes the filaments to set or harden, after which they are drawn over roll 12 and around stretching rolls 13 and 14. Stretching is accomplished in conventional manner by controlling the tension between rollers 13 and 14 while heating the filaments, preferably by means of steam. The stretched filaments 15 are then drawn over roll 16 and collected on their respective take-up rolls 17, 18 and 19.

Figure 2:
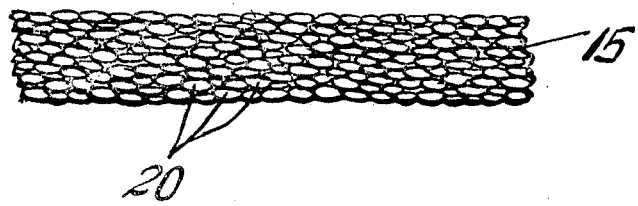
FIG. 2 is a plan view, to an enlarged scale, illustrating the surface characteristics of the filaments formed according to the present invention.

FIG. 2 of the drawing illustrates a section of a synthetic thermoplastic filament 15 formed according to one embodiment of the present invention showng the uniform surface pores 20 formed by the removal of soluble solid powder particles from the filament surface. Filaments having the powder particles retained on the surface are not illustrated since the illustration thereof would be substantially identical to the filament of FIG. 2, the pores 20 thereof being powder particles adhered to the filament surface.

The following example illustrates the production of nylon filaments according to one embodiment of the present invention, the formation of a nylon fabric therefrom and the conversion of such fabric to a typewriter ribbon.

The extrusion composition is prepared by melting flakes of nylon (hexamethylene diamine-adipic acid) at a temperature of about 285° C. in the extrusion device and feeding it from the extrusion hopper 1 into the extrusion die 2 or spinneret under pressure. The orifice of the die have a diameter of 0.25 mm., which equals about 0.01 inch, and the nylon is pumped through the orifices at a speed of about 2500 feet per minute.

The extruded filaments 3 travel down through the powder cylinder 4, which is preferably heated or provided with a counterflow of hot air, where they are contacted with an air atmosphere concentrated with powder particles of salt. The salt powder is preferably sodium chloride pulverized to a particle size ranging from 0.0001 inch to 0.001 inch, which equals from about 2.5 to 25 microns, and is introduced into the powder cylinder from hoppers 5 having screened openings. The hoppers are gently vibrated to release a uniform metered amount of salt powder, from about 1 to 5 pounds per minute, into a funnel 6 which surrounds the filaments and directs the flow of salt powder thereagainst. The salt powder which does not cling to the filaments at the funnel opening or during descent through the cylinder is collected on a pan 7 beneath the cylinder and is reintroduced into hoppers 5 along with a continuous new supply of salt powder.

The filaments 8 leaving the powder cylinder carry a uniform coating of salt particles over the entire surface. They travel over at least one roll on their way to the quenching bath, the use of several rolls being preferred in order to press the salt particles deeper into the surface of the filaments.

The quenching bath consists of lukewarm water which dissolves the salt from the filament surface and cools the filament to cause it to set and harden. It is preferred to pass the filaments through a series of two or more such baths to insure complete removal of the salt particles. Also the first bath should be provided with continuous recycling means for removing and recovering the salt since it quickly becomes contaminated with dissolved salt.

The desalted filaments are then passed on to a steam chamber containing spaced rolls, the spacing of which can be varied to produce the desired tension and stretching of the filaments. The steam heats the filaments slightly so that stretching is possible, and stretching increases the surface area of the pores or depressions. Thereafter the filaments are collected on spools for end use and have a surface appearance as illustrated in FIG. 2.

To illustrate the formation of one fabric suitable for use as a typewriter ribbon, filaments having a denier of about 2 are twisted together in bundles of 34 to form multi-filament threads having a denier of 68. These threads are then woven together in conventional manner to form nylon fabric having a warp count of 160 and a filler count of 100 and a square inch count of 260. It should be understood, however, that conventional filament threads may be used as either the warp or filler threads if desired.

The nylon fabric is then inked in conventional manner with a liquid typewriter ribbon ink by impregnating the fabric with the ink and passing it in the nip of rollers to force the ink into the fabric and remove the excess. The ink is a conventional blend of mineral oil or other oils and carbon black and nigrosine.

The final ribbon has a higher capacity for ink than conventional nylon fabrics of equal thread count and caliper. The ink is more strongly retained by the rough filament surfaces so that the ribbon is cleaner to handle and has a more uniform wear.

When using insoluble powder particles such as carbon black or attapulgite according to the foregoing procedure, the only changes which are preferably made are in connection with the cooling of the filaments and the weaving of the fabric. If the powder particles are absorbent, such as attapulgite, then cooling is preferably accomplished by means of cold air in order to avoid the necessity for drying the filaments prior to stretching. Also, since the denier and diameter of the filaments is increased by the surface coating of powder particles, then the number of filaments per thread is preferably reduced to 25 and the warp count is reduced to 150 and the filler count to 90 to produce a square inch count of 240. However, such ribbons have an even greater ink capacity due to their absorbent filament coatings and thus have a longer useful life.

For the production of heat-fused matted non-woven fabrics according to another embodiment of this invention, the filaments or fibers are extruded through a wider orifice, in the area of from 0.5 mm. to 2 mm., which equals about 0.02 inch to 0.08 inch, and the powder particles comprise a finely-divided resin which has a lower softening or tackifying temperature than the fiber-forming material. For example, the fibers may be extruded from nylon and contacted with finely-divided particles of polystyrene resin in an apparatus as illustrated by FIG. 1 of the drawing. The particle size of the polystyrene resin preferably averages within 0.0001 inch to 0.001 inch. The coolant bath contains water or some other non-solvent for the resin particles, and the filaments are stretched while the resin particles remain adhered.

Thereafter the resin particle coated filaments or fibers are matted into fabrics in conventional method by contacting a number of the fibers to form a fabric of the desired weight or density and applying heat. However, the amount of heat applied is only sufficient to soften the resin particles while not softening the fiber-forming resin of the filaments. In the case of nylon filaments and polystyrene resin particles, the amount of heat applied is in the area of 150° C., at which temperature the nylon filaments are unaffected while the styrene particles fuse and bond together with other styrene particles on contacting filaments. When heat is removed and the fabric cools, every filament is bonded to contacting filaments at each point of contact so that the fabric has exceptional uniformity of strength and stability. Similarly, the fabric produced has increased absorbency due to the roughness of the filament surfaces and the presence of interstices or voids between the resin particles on the filament surfaces, particularly when the amount of heat applied during fusion is only sufficient to render the resin particles tacky and insufficient to melt the particles and cause them to flow together.

The present invention applies to fiber-forming materials of thermoplastic composition including but not limited to polyamides such as nylon, hydrocarbon polymers such as polyethylene, acrylic resins such as polyacrylonitrile (Orlon), polyester resins such as polyethylene terephthalate (Dacron), and others which will be clear to those skilled in the art.

While the filaments treated according to this invention most commonly have a diameter corresponding to a nylon denier of from 1 to 4, it should be understood that the denier or diameter of the filaments is immaterial and will have a bearing only upon the size of powder particles used. Large diameter filaments or fibers for use in forming coarse fabrics or for use as paintbrush bristles or the like can accept powder particles having an average of up to 0.01 or more. However, they are otherwise produced in the same manner as thinner filaments.

Similarly the thickness of the extruded films which may be treated according to this invention is not critical. Such films generally have a thickness of from 0.35 mil up to about 5 mils and are generally treated on only one surface to which it is desired to adhere a coating such as a pressure-sensitive transfer layer of the types disclosed in U.S. Pats. Nos. 2,810,661 and 2,820,717. The powder particles are preferably applied to the top tacky surface of the film immediately after extrusion, either on a flat surface or as the film is drawn vertically through a chamber similar in function to the one illustrated by FIG. 1 of the drawings, and thereafter the film is cooled. As in the case of the filaments, the powder may be retained on the film to provide a rough, porous receptive surface or may be dissolved away to leave a rough pitted receptive surface prior to or after the orientation or stretching of the film which takes place in conventional manner.

Variations and modifications may be made within the scope of the claims and portions of the improvements may be used without others.

I claim:
1. The process of producing a pressure-sensitive, ink-releasing duplicating ribbon which comprises the steps of:
   (a) extruding continuous smooth-surfaced monofilaments consisting essentially of synthetic thermoplastic resinous composition,
   (b) contacting said monofilaments with a finely-divided powder material having a particle size smaller than the diameter of said monofilaments while said monofilaments are heated and have a tacky surface, whereby the powder material adheres to substantially the total surface of the monofilaments and masks the surface thereof,

(c) cooling the monofilaments to eliminate the tackness of their surfaces having the said powder adhered thereto,
(d) stretching the monofilaments to impart strength thereto,
(e) forming the fibers into an ink-receptive fabric, and
(f) impregnating said fabric with an oleous ink to form a pressure-sensitve duplicating ribbon.

2. The process according to claim 1 in which the monofilaments are woven to form the fabric.

3. A duplicating ribbon produced according to the process of claim 1.

4. The process according to claim 1 in which the finely-divided material is soluble in a liquid to which the monofilaments are inert, and the finely-divided material is dissolved from the monofilaments to leave ink-receptive surface pores on the monofilaments in the fabric.

5. The process according to claim 4 in which the finely-divided material is a water-soluble salt and the monofilaments are washed in water to remove the salt prior to forming the fabric.

6. The process of producing a fabric having increased ink- and dye-receptivity which comprises the steps of:
(a) contacting heated synthetic thermoplastic fibers having a tacky surface with finely-divided synthetic thermoplastic resin particles having a lower softening point than the synthetic thermoplastic fibers to cause the particles to adhere to the tacky surface, said finely-divided resin having a particle size smaller than the diameter of the said fibers,
(b) cooling the fibers to eliminate the tackiness of their surface,
(c) stretching the fibers to impart strength thereto, and
(d) forming the fibers into a fabric by matting a number of the fibers together and applying a sufficient amount of heat to soften the resin particles and cause the fibers to be thereby bonded together, the amount of heat being insufficient to melt the thermoplastic fibers.

7. An ink- and dye-receptive fabric produced according to the process of claim 6.

References Cited

UNITED STATES PATENTS

| | | | |
|---|---|---|---|
| 2,167,990 | 8/1939 | Neidich. | |
| 2,052,590 | 9/1936 | Whitehead | 264—78 XR |
| 2,327,087 | 4/1943 | Austin | 264—288 XR |
| 2,862,284 | 12/1958 | Wiczer | 161—180 XR |
| 2,909,443 | 10/1959 | Wolinski | 161—162 XR |
| 2,913,769 | 11/1959 | Kastli | 161—178 XR |
| 2,984,912 | 5/1961 | Robertson et al. | 264—344 XR |
| 3,154,461 | 10/1964 | Johnson | 161—124 XR |
| 3,268,639 | 8/1966 | Taft | 264—288 XR |
| 3,303,045 | 2/1967 | Newman | 117—36.1 |

ROBERT F. BURNETT, Primary Examiner

W. A. POWELL, Assistant Examiner

U.S. Cl. X.R.

28—75; 57—153, 164; 117—7, 16, 36.1, 47, 66; 139—426; 156—181, 279, 283, 306; 161—150, 170, 174, 176; 264—131, 290, 344